Patented Oct. 9, 1951

2,570,794

UNITED STATES PATENT OFFICE 2,570,794

PURIFICATION OF ORGANIC NITRILES

William E. Grigsby and Edward S. Bloom, Wilmington, Del., assignors to E. I. du Pont de Nemours & Company, Wilmington, Del., a corporation of Delaware No Drawing. Application July 20, 1950, Serial No. 175,026

5 Claims. (Cl. 260—465.3)

This invention relates to processes which involve the step of separating chlorine-containing impurities from organic nitriles, such as 1,4-dicyanobutenes and adiponitrile.

In the Langkammerer patent, U. S. 2,478,285, it is disclosed that 1,4-dicyano-2-butene can be isomerized to a liquid isomer, 1,4-dicyano-1-butene by heating a mixture of 1,4-dicyano-2-butene and an amine having a pKa value at 20° to 25° C. between 6 and 12. The quantity of amine generally employed according to the Langkammerer process is between 0.08 and 2% by weight of 1,4-dicyano-2-butene. The 1,4-dicyano-2-butene employed in Langkammerer's process is obtainable by cyanation of 1,4-dichlorobutenes, e. g. by the method of U. S. 2,342,101.

The present invention is distinguished from the invention of Langkammerer in that it is directed to the treatment of a mixture of 1,4-dichlorobutene and 1,4-dicyano-2-butene, with the amine reactant under certain conditions hereinafter disclosed, whereby not only the isomerization reaction occurs, but also a reaction takes place between the 1,4-dichlorobutene component and the amine reactant, forming a product which is readily removable from the remaining 1,4-dicyanobutene.

The removal of 1,4-dichlorobutenes from mixtures thereof with 1,4-dicyano-2-butene is highly desirable. Recently, efficient cyanation processes have been disclosed for producing 1,4-dicyano-2-butene (together with 1,4-dicyano-1-butene) by reaction between 1,4-dichlorobutenes and HCN in the presence of aqueous hydrochloric acid (U. S. Patents 2,477,617, 2,477,672, 2,477,674). The reaction products thus obtained are contaminated with small amounts of 1,4-dichlorobutenes. By careful distillation of the reaction products thus obtained 1,4-dicyano-2-butene which is virtually pure and free of 1,4-dichlorobutenes is obtainable. However, this highly selective fractionation is quite costly, not only because it requires an efficient fractionating column, but more especially because the mixture is highly corrosive to mild or stainless steels.

Moreover, the virtually complete removal of the specific chlorine-containing compounds which cause corrosion (especially 1,4-dichlorobutenes, as contrasted with certain less active chloroalkanes which are much less harmful) is necessary in order to avoid further difficulties otherwise encountered in using the impure 1,4-dicyano-2-butene as a source of adiponitrile and hexamethylene diamine in the manufacture of nylon; these other difficulties include (1) formation of ammonium chloride during hydrogenation of the 1,4-dicyanobutene, and (2) poisoning of the hydrogenation catalyst during the said hydrogenation, and during the hydrogenation of adiponitrile to hexamethylene diamine.

An object of this invention is to provide a process for separating corrosive chlorine-containing impurities from 1,4-dicyanobutenes obtained by reaction of dichlorobutene with HCN in the presence of aqueous acid. Another object is to separate organic chlorine-containing impurities from adiponitrile. Other objects of the invention appear hereinafter.

The present invention provides a process for separating organic chlorine-containing impurities from 1,4-dicyanobutenes and/or 1,4-dicyanobutane (adiponitrile) containing such impurities, especially certain chlorohydrocarbons and chlorohydroxyhydrocarbons, derived from a reaction mixture in which dichlorobutene reacts with HCN in the presence of aqueous acid to form 1,4-dicyano-2-butene, and certain other chlorine-containing organic compounds, which are present as impurities in adiponitrile made by reaction of sodium cyanide with 1,4-dichlorobutene. The process of this invention, in a preferred embodiment, comprises heating the said impure 1,4-dicyanobutene (or 1,4-dicyanobutane), in the presence of benzene or other suitable inert diluent, and in the presence of water and a quantity of trimethylamine or triethylamine equal to from 5 to 500 parts by weight per part of chlorine in the said impurity at a temperature of 90° to 180° C., preferably 125° to 180° C., under at least sufficient pressure to maintain the 1,4-dicyanobutene, benzene, and trimethylamine in the liquid phase, continuing the said heating until the non-aqueous phase, when extracted with water, becomes relatively free of chlorine compounds, and thereafter recovering the unconsumed amine by distillation from the aqueous extract and recovering pure 1,4-dicyanobutene by distillation of the non-aqueous phase. Alternatively, the excess amine may be distilled from the mixture prior to extraction of the organic salt (formed from the amine and chlorine-containing impurity) with water. The removal of the aforementioned chlorine-containing impurities is necessary in order to avoid corrosion and/or catalyst poisoning, as described in detail hereinafter.

The 1,4-dicyanobutenes which may be employed in the practice of this invention are prepared most efficiently by cyanation of dichlorobutenes in the presence of copper-containing catalysts in aqueous acidic media (cf. U. S. Patents 2,477,672, 2,477,674, and 2,477,617). If desired, the 1,4-dicyanobutene which is employed in practicing the present invention may be treated preliminarily for removal of copper compounds by extracting a benezene solution thereof with aqueous hydrogen cyanide by the method described in copending Calkins application S. N. 145,924, filed February 23, 1950, now Patent No. 2,557,258. In general, the 1,4-dicyanobutenes obtained in the aforesaid processes contain chlorohydrocarbons and chlorohydroxyhydrocarbon impurities, including 1,4-dichlorobutenes, the quantity of these impurities being about 0.1 to 1.5% by weight based on the weight of dicyanobutene. As illustrated hereinafter, the removal of the corrosive impurities from these products is accomplished most efficiently by using 5% to 50% of trimethylamine, based on the weight of dicyanobutene.

The present invention includes the discovery that trialkylamines of the class consisting of trimethylamine and triethylamine react with the aforesaid impurities to form a reaction product which can be extracted quantitatively from the benzene solution of 1,4-dicyanobutene by means of water. In general, the reaction between the amine and the chlorohydrocarbon or chlorohydroxyhydrocarbon impurities which give rise to corrosion difficulties requires a temperature of at least about 90° C. for reasonably rapid reaction. The maximum temperature which may be employed is limited, since thermal decomposition of 1,4-dicyanobutenes, even in the presence of the benzene diluent, becomes noticeable at temperatures slightly above 180° C., and is more rapid at temperatures above 200° C. For rapid removal of these specific impurities, in accordance with this invention, it is desirable to maintain the temperature within the range of 125° to 180° C.

To a considerable extent the lower trialkylamines are rather unique in their ability to remove these impurities from 1,4-dicyanobutenes and/or 1,4-dicyanobutane. Higher trialkylamines are either less readily removed themselves, or lead to the formation of products which are less readily extracted by means of water. Moreover, substituent groups which tend to impart affinity for the aqueous phase (which is desirable) frequently have other effects which are undesirable; for example, tertiary amine reactants containing hydroxyl substituents are found to react with 1,4-dicyanobutene, and for this reason they are not employed in the practice of the present invention.

For best results it is essential to employ a relatively large excess of the trialkylamine reactant. It is preferred to employ at least about five parts by weight of trimethylamine or triethylamine per part of chlorine in the 1,4-dichlorobutene impurity in 1,4-dicyanobutene. Good removal can be achieved, for example, by employing a quantity of trimethylamine equal to about 50% of the weight of crude 1,4-dicyanobutene.

The following examples illustrate the invention, and demonstrate some of the advantages thereof:

*Example 1.*—A mixture containing 4 parts by weight of benzene, 1 part 1,4-dicyano-2-butene (the crude product obtained by cyanation of dichlorobutenes with HCN in the presence of an aqueous acid as disclosed in the Webb and Tabet Patent U. S. 2,477,672) is heated with 0.5 part trimethylamine and 0.04 part water at 160° C. for 20 minutes. Trimethylamine is distilled from the resulting product, which is then washed with water until the non-aqueous phase is virtually free of ionic chlorine. The non-aqueous phase is then distilled for recovery of virtually chlorine-free 1,4-dicyano-1-butene (initial chlorine content of the crude 1,4-dicyanobutene, 3,000 P. P. M.). Additional trimethylamine is recovered from the aqueous phase by distillation after the addition of sodium hydroxide.

*Example 2.*—A benzene solution of 200 pounds of crude dicyanobutene (containing 4 parts by weight of benzene and 0.012 part of chlorine as chlorohydrocarbon impurity, chiefly 1,4-dichlorobutene, per part of dicyanobutene), obtained by reaction of HCN with dichlorobutene in the presence of aqueous hydrochloric acid containing a cuprous cyanide catalyst, is passed through a continuous reactor maintained at 150° C. under 250 pounds per square inch pressure, while feeding 40% trimethylamine and 16% water based on the weight of dicyanobutene introduced (contact time 15 to 20 minutes). Trimethylamine is recovered by distillation. Distillation of the non-aqueous phase after extraction with water gives purified liquid 1,4-dicyano-1-butene, virtually free of chlorine, in 95% yield.

*Example 3.*—225 milliliters of a benzene solution containing 38.2 grams of crude 1,4-dicyanobutene-2 (chlorohydrocarbon impurity, equivalent to 1.2% Cl, mostly 1,4-dichlorobutene), obtained by reaction of HCN with dichlorobutene in the presence of aqueous hydrochloric acid containing a cuprous cyanide catalyst, is heated in a stainless steel lined pressure resistant reaction vessel with 9.0 grams of water and 19.1 grams of trimethylamine for one hour at 160° C. at autogenous pressure. The vessel is then cooled and the contents are withdrawn, after which the vessel is rinsed out with benzene. The benzene rinse is combined with the reaction product and is washed five times with one-fifth its volume of water after evaporation of most of the trimethylamine; the water layer is then extracted several times with benzene; the combined benzene layers are distilled at atmospheric pressure to remove benzene. The dicyanobutene is then distilled from the residue at 87° to 95° C. at a pressure of about 1 mm. of mercury. The distilled product amounts to 33.8 grams, and it contains about 75 P. P. M. of chlorine.

*Example 4.*—250 milliliters of the benzene solution, obtained as described in Example 3, containing 42.5 grams of 1,4-dicyanobutene, is mixed with 9.3 grams of water and 4.3 grams of trimethylamine and is heated for one hour at 160° C. under autogenous pressure. The washed and distilled product amounts to 39.5 grams, corresponding to 92.9% recovery, and contains 400 P. P. M. chlorine.

*Example 5.*—Example 4 is repeated using only 2.1 grams of trimethylamine. The distilled product amounts to 40.2 grams, corresponding to 94.7% recovery, and contains 1080 P. P. M. chlorine.

*Example 6.*—A sample of pure 1,4-dicyano-2-butene is admixed with 1.2% by weight of mixed dichlorobutenes, and the resulting mixture is heated, in a flask equipped with a reflux condenser, at boiling temperature (temperature of the bath in which the flask is immersed, 300° to 335° C.). After 45 minutes of heating the mixture decomposes with the generation of much heat and evolution of large volumes of ammonia and hydrogen cyanide. The experiment is repeated exactly, using purified 1,4-dicyano-2- butene, free of dichlorobutenes. The pure material requires 87 minutes before it decomposes. This experiment demonstrates the fact that the dichlorobutenes have an adverse effect upon the thermal stability of 1,4-dicyano-2-butene.

Example 7.—A benzene solution of crude 1,4-dicyano-2-butene similar to that employed in Example 1 was continuously distilled and strips of mild steel, Type 316 stainless steel and Type 304 stainless steel, were placed in the distillation flask in contact with the dicyanobutene residue, for 30 hours at 160° C. The experiment was repeated using the trimethylamine-treated solution, obtained as in Example 1. The weight losses of the metal strips were determined, and these losses were calculated in terms of penetration per year. The results were as follows:

|  | Corrosion (mils/year) | | |
| --- | --- | --- | --- |
|  | Mild Steel | 316 Stainless Steel [1] | 304 Stainless Steel [2] |
| Untreated benzene-dicyano-butene solution | 427 | 362 | 458 |
| Trimethylamine-treated benzene-dicyanobutene solution | 10.5 | 0.49 | 3.82 |

[1] 67.9 Fe, .10 C, 17 Cr, 3.0 Mo, 12 Ni.
[2] 0.11 max. C, 17–19 Cr, 7–9 Ni, bal. Fe.

Example 8.—Crude 1,4-dicyano-2-butene (same as in Example 1) was fed continuously to a falling-film flash vaporizer. The overhead product was fed continuously to a topping column to remove low-boiling impurities. The topped dicyanobutene was withdrawn continuously from the calandria of this column and fed continuously to a refining column, from which refined dicyanobutene was taken overhead. All columns were operated at head pressures of 5 to 10 mm. of mercury. Weighed samples of Type 316 stainless steel were suspended by means of polytetrafluoroethylene strings at various points in the refining train to determine the extent of corrosion at these places. The following table summarizes the results obtained, comparing several runs with crudes treated with trimethylamine by the method of Example 1, with corresponding untreated crudes.

| Location from which sample was taken | Corrosion (mils/year) | | NH4Cl formation during subsequent hydrogenation | |
| --- | --- | --- | --- | --- |
|  | Trimethylamine-treated | Untreated | Trimethylamine-treated | Untreated |
| Flasher tube | nil to 2.59 | 0.2 to 95.0 | No | Yes. |
| Flasher vapor | nil to 2.69 | 24.1 to 57.0 | No | Yes. |
| Flasher condenser | nil | 64.0 to 64.8 | No | Yes. |
| Topping condenser | nil to 2.27 | 24.9 to 110 | No | Yes. |
| Topping vapor | nil to 1.9 | 5.12 to 67.5 | No | Yes. |

From the foregoing table it is apparent that treatment of the dicyanobutene crudes with trimethylamine in the manner disclosed results in removal of chlorine-containing compounds, and to a considerable extent eliminates the corrosiveness which characterizes the crude dicyanobutenes.

Example 9.—Adiponitrile is treated for removal of small amounts of chlorinated impurity, including chlorocyanobutane by the method of Example 1, whereby the chlorine content is decreased from 58 P. P. M. to 14 P. P. M. In a series of hydrogenations of adiponitrile to hexamethylene diamine using cobalt catalyst at 142° to 145° C., the catalyst activity decreased 2.08 times as rapidly when the chlorine content of the adiponitrile was 58 P. P. M. as it did when the chlorine content was 14 P. P. M.

Example 10.—A mixture consisting of 65.5 grams of crude 1,4-dicyanobutenes (containing about 2500 P. P. M. of Cl in the form of 1-chloro-4-cyanobutene, 1,4-dichloro-2-butene, 1,2-dichlorobutane, and 1-chloro-4-hydroxy-2-butene), 190 milliliters of benzene, and 7.9 grams of triethylamine was heated in a closed vessel at 125° C. for 2 hours. The resulting product was washed with water repeatedly until all of the ionic chlorine (organic salt) had been removed. The mixture was then flash-distilled, yielding 52.2 grams of dicyanobutene having a chlorine content of 290 P. P. M.

Example 11.—A mixture consisting of 258 grams of crude 1,4-dicyanobutenes (same as employed in Example 10) and 106 grams of triethylamine was heated at the boiling temperature under atmospheric pressure (ca. 90° C.) for 9 hours. The resulting mixture was flash-distilled, and it was determined by analysis that the distillate contained 1920 P. P. M. of Cl in ionic form. The distillate was dissolved by benzene and was washed with water until free of ionic Cl. Distillation of the resulting benzene layer gave 1,4-dicyanobutene having only 20 P. P. M. of Cl.

A comparison of the results obtained in Examples 3, 4, and 5 makes it clear that the use of a very large excess of trimethylamine is required in order to accomplish the desired removal of chlorine compounds. This is shown in the following table.

| Example | Trimethylamine used, Wt. Per Cent Dicyanobutene | Distilled Product | |
| --- | --- | --- | --- |
|  |  | Per Cent Recovery | Cl Content, P. P. M. |
| 3 | 50 | 88.5 | 75 |
| 4 | 10 | 92.9 | 400 |
| 5 | 5 | 94.7 | 1,080 |

An important advantage which results from removal of the chlorine-containing impurities from 1,4-dicyano-2-butene by the process of this invention resides in the improvement in catalyst life which is observed during hydrogenation of dicyanobutene to adiponitrile. The following results were obtained in vapor phase (300° to 350° C.) hydrogenation of dicyanobutene over Pd-charcoal catalyst.

| Cl Content of Dicyanobutene, P. P. M. | Time of Catalyst Life, hours | NH4Cl formation |
| --- | --- | --- |
| 252 | 60 | Yes |
| 60 | 400–500 | No |

It is to be understood that the foregoing examples are illustrative only and that numerous methods for practicing the invention will occur to those who are skilled in the art. For example, any suitable method for recycling the trimethylamine reactant may be employed if desired.

In practicing the present invention, any suitable reaction vessel may be employed, although it is preferable to employ materials of construction which are relatively inert and corrosion-resistant. The purified 1,4-dicyano-1-butene which is obtained in the practice of the invention, as explained hereinabove, is valuable and useful in view of its superiority as an intermediate for the preparation of adiponitrile and hexamethylenediamine by catalytic hydrogenation.

We claim:

1. In a process for separating from dinitriles of the class consisting of 1,4-dicyanobutenes and 1,4-dicyanobutane organic chlorine-containing impurities which act as hydrogenation catalyst poisons during subsequent hydrogenation of the said nitriles, the steps which comprise heating the said nitrile containing the said chlorine-containing impurities with an amine of the class consisting of trimethylamine and triethylamine, at a temperature of 90° to 180° C., in the liquid phase, and thereafter extracting with water the salt produced by reaction between the said amine and chlorine-containing impurity, and recovering the nitrile from the resulting mixture, said nitrile being thereby freed of compounds which interfere with subsequent hydrogenation thereof.

2. A process for separating corrosive organic chlorine-containing impurities, including 1,4-dichlorobutene, from 1,4-dicyanobutene containing 0.1 to 1.5%, by weight, of such impurities, said 1,4-dicyanobutene and impurities being constituents of the reaction mixture obtained by reaction between dichlorobutene and HCN in the presence of aqueous hydrochloric acid, which comprises heating the said 1,4-dicyanobutene, in the presence of benzene as a diluent, at a temperature of 90° to 180° C., in the liquid phase, with a quantity of trimethylamine equal to from 5% to 50% of the weight of dicyanobutene, removing the unreacted excess of trimethylamine as such from the resulting benzene solution, also extracting water-soluble salt, formed by reaction between trimethylamine and chlorine-containing impurity, from the said benzene solution, and thereafter distilling 1,4-dicyano-1-butene from the resulting mixture.

3. The process set forth in claim 2 in which the said temperature is maintained within the range of 120° to 180° C.

4. The process of claim 2 in which the removal of the said excess trimethylamine is accomplished by direct distillation thereof from the said benzene solution prior to the said extraction of the water-soluble salt.

5. A process for separating corrosive organic chlorine-containing impurities from 1,4-dicyanobutenes containing such impurities, said 1,4-dicyanobutenes being obtained by reaction between dichlorobutene and HCN in the presence of aqueous hydrochloric acid to form 1,4-dicyanobutenes comprising 1,4-dicyano-2-butene, which comprises heating the said impure 1,4-dicyanobutene in the presence of benzene as a diluent, and in the presence of water, with a quantity of trimethylamine equal to from 5 to 500 parts by weight per part of chlorine in the said impurity, at a temperature within the range of 90° to 180° C. under at least sufficient pressure to permit the 1,4-dicyanobutene, benzene, and trimethylamine to coexist in the liquid phase, extracting the non-aqueous phase with water, whereby an aqueous extract containing trimethylamine and a reaction product of trimethylamine with the said chlorine-containing impurity is obtained, recovering trimethylamine from the said aqueous extract, and recovering the remaining trimethylamine, and also 1,4-dicyanobutene, by distillation of the non-aqueous phase.

WILLIAM E. GRIGSBY.
EDWARD S. BLOOM.

REFERENCES CITED

The following references are of record in the file of this patent:

UNITED STATES PATENTS

| Number | Name | Date |
| --- | --- | --- |
| 1,797,877 | Moore | Mar. 21, 1931 |
| 2,242,309 | Lazier et al. | May 20, 1941 |
| 2,349,752 | Pollack | May 23, 1944 |
| 2,399,349 | Hochwalt | Apr. 30, 1946 |
| 2,415,261 | Rogers | Feb. 4, 1947 |
| 2,448,755 | Zellner | Sept. 7, 1948 |
| 2,478,285 | Langkammerer | Aug. 9, 1949 |